United States Patent [19]

Holbrook et al.

[11] 4,376,791
[45] Mar. 15, 1983

[54] FRUCTOSE-CONTAINING FROZEN DESSERT PRODUCTS

[75] Inventors: James L. Holbrook, Illiopolis; Laren M. Hanover, Mt. Zion, both of Ill.

[73] Assignee: A. E. Staley Manufacturing Company, Decatur, Ill.

[21] Appl. No.: 338,820

[22] Filed: Jan. 11, 1982

[51] Int. Cl.³ ............................................... A23G 9/04
[52] U.S. Cl. ...................................... 426/565; 426/567
[58] Field of Search ......................... 426/565, 567, 566

[56] References Cited

U.S. PATENT DOCUMENTS

| | | | |
|---|---|---|---|
| 3,236,658 | 2/1966 | Little | 99/136 |
| 3,335,013 | 8/1967 | Wolfmeyer | 99/136 |
| 3,956,519 | 5/1976 | Evans et al. | 426/565 |
| 4,145,454 | 3/1979 | Dea et al. | 426/565 |
| 4,146,652 | 3/1979 | Kahn et al. | 426/564 |
| 4,219,581 | 8/1980 | Dea et al. | 426/567 |
| 4,244,977 | 1/1981 | Kahn et al. | 426/565 |
| 4,335,155 | 6/1982 | Blake | 426/565 |
| 4,346,120 | 8/1982 | Morley | 426/567 |

*Primary Examiner*—Jeanette M. Hunter
*Attorney, Agent, or Firm*—M. Paul Hendrickson; Charles J. Meyerson

[57] ABSTRACT

Frozen dessert products formulated with high levels of fructose and the inclusion of maltodextrin and sweetener additives in prescribed amounts. The frozen desserts may be formulated with corn derived sweeteners as the sole non-dairy sweetener additives.

17 Claims, No Drawings

FRUCTOSE-CONTAINING FROZEN DESSERT PRODUCTS

BACKGROUND OF THE INVENTION

Frozen dessert products of the smooth, creamy texture (e.g. ice cream, frozen custards, ice milk, etc.) require a delicate balance of formulated ingredients to achieve the preceived coldness, melt-down, mouthfeel, taste and textural characteristics normally expected of a high quality frozen dessert product. Most frozen dessert products extensively rely upon dairy products. The early frozen dessert products were primarily prepared from cream with the cream providing the basic ingredients (milk protein, sugar, butterfat, emulsifiers and stabilizer, etc. system) for the frozen dessert recipe. Although these early recipes have been changed, most frozen dessert manufacturers still rely upon dry milk solids and butterfat as basic ingredients.

In the earlier frozen dessert products, disaccharides (lactose and sucrose) were the primary sweetening agents. Subsequently, low-cost 36 and 42 D.E. corn syrups were used as supplementary sweetener additives in frozen dessert recipes. By mid 1960, crystalline dextrose was extensively used with sucrose and the 36 and 42 D.E. corn syrups in the manufacture of frozen dessert products.

In 1967, high fructose corn syrup (HFCS) containing approximately 42% fructose and 50-52% dextrose became commercially available. By appropriately combining the 36 and 42 D.E. corn syrups, these 42% HFCS were effectively formulated into frozen dessert recipes. More recently, the HFCS manufacturers have introduced corn syrups of a 55-60% and 90% fructose content.

Substantial changes in the physical, organoleptical and textural properties arise from recipes formulated with these 55% and higher HFCS. The delicate balance of conventional recipe components needed for the desired freezing point, melt-down, preception of coldness, taste, mouthfeel and smooth, creamy textural characteristics are not achieved. The higher fructose content excessively depresses the dessert product freezing point. At conventional frozen dessert freezing temperatures, these 55%+HFCS dessert formulations remain soft. Such soft products are impractical for many commercial adaptations. Redesign of the manufacturing equipment and facilities, the dispensing equipment, distribution system or storage facilities to compensate for the freezing temperature depression is impractical.

Conventional dessert recipes formulated with high fructose corn syrups of 55% or higher fructose also have inferior melt-down characteristics. Such frozen products melt more rapidly (at normal serving temperatures) than the conventional recipes. These accelerated melt-down characteristics render these products impractical for cone servings. Moreover, frozen desserts formulated with excessive fructose provide a dessert product which is preceived as being much colder than conventional products.

References pertaining to the use of fructose in frozen dessert recipes include U.S. Pat. Nos. 3,335,013 by Wolfmeyer, 4,146,652 by Kahn et al. and 3,236,658 by Little and *Seminar Proceedings Products of the Corn Refining Industry in Food,* Corn Refiners Association, Inc., May 9, 1978. The Wolfmeyer patent discloses a frozen dessert recipe in which the sweetener additive consisted essentially of about 30 to 70% maltose, 10 to 40% dextrose and 3.5-20% levulose in conjunction with 10-40% penta- and higher polysaccharides. The levulose source is identified as invert syrups. The sweetener portion of Wolfmeyer additive is similar to conventional frozen dessert recipes in that it primarily relies upon disaccharides (e.g. maltose) as the principal sweetening component. The Wolfmeyer sweetening additive is combined with a basic ice cream formula of approximately 10% fat, approximately 10% non-fat milk solids, 0.3% stabilizer and emulsifier, with the balance being water.

The Little patent discloses a frozen dessert which contains approximately 8 to 13% by weight fructose and relies extensively upon protective colloids and gum stabilizers (e.g. carboxymethyl cellulose, Irish moss extract, locust bean gum, etc.). The Little frozen dessert sweetener portion consists of lactose and fructose and is especially designed for use by diabetics. Atypical of conventional frozen dessert products which normally contain (on a total non-fat solids basis) at least 70% by weight fermentable sugars, the Little formulation contains less than 60% fermentable sugars. The low sweetening agent concentration reportedly slightly depresses the freezing temperature.

The Kahn et al. patentees disclose a whipped dessert formulated with 15 to 45% water, sugar in a ratio to water of 1-2:1, about 2.5 to 30% fat and a sweetening agent portion comprised of fructose and dextrose at a concentration of at least 50% by weight of the total sugar. The 42% HFCS are mentioned as a dextrose and fructose source. The dessert products reportedly remain soft and spoonable at 10° F. The formulation, freezing temperature and melt-down characteristics of the Kahn et al. dessert products are unsuited for ice cream or ice milk applications.

DESCRIPTION OF THE INVENTION

According to the present invention, there are provided frozen dessert compositions of a smooth, creamy textural consistency formulated with milk protein, lactose, butterfat, starch-derived sweeteners and maltodextrin in which at least 70% by weight of the non-fat solids are sweetener solids (including lactose and other mono- and disaccharide sweetener sources) with fructose solids content comprising at least 25% by weight of the total monosaccharide and disaccharide sweetener content of the frozen dessert composition, said composition comprising 30 parts by weight fructose, about 10 to about 40 parts by weight lactose and about 10 to about 60 parts by weight milk protein and maltodextrin with the maltodextrin comprising from 20% to 80% of the total milk protein and maltodextrin weight and a fructose to maltodextrin weight ratio ranging from about 6:1 to about 1:3.

It has now been discovered that the fructose level in frozen dessert products may be significantly increased by combining fructose, in prescribed proportions, with milk proteins (namely casein), maltodextrin, and lactose. This permits the inclusion of 55% and higher HFCS without adversely affecting the textural, taste, freezing temperature and melt-down characteristics of the frozen dessert. The combination provides a stabilized frozen dessert system compatible with complementary emulsifying additives and high butterfat levels. This enables the frozen dessert manufacturer to comply with the regulatory identity standards by adjusting the butterfat content to a sufficiently high level to compensate for the milk protein and lactose replaced by the maltodextrins. The amount of milk protein and maltodextrin as well as the proportionate amounts thereof are carefully controlled. The ingredient combination permits the frozen dessert manufacturer to use corn syrups and lactose as the sole sweeteners. The freezing point and melt-down characteristics of the dessert product closely approximate conventional dessert products.

The aerated frozen desserts are formulated with milk proteins, lactose, triglyceride fats (e.g. butterfat), sweetener additives and other conventional dessert additives such as flavoring, coloring, stabilizers and emulsifiers. The desired level of sweetness in the frozen desserts is derived from mono- and disaccharide-containing sweetener additives. On a total non-dairy sweetener additive weight basis, dextrose and fructose constitute the major non-dairy sweeteners. The non-dairy sweetener additives consist essentially of fructose and dextrose containing sweeteners such as corn syrup of a D.E. 20 and higher, and the high fructose corn syrups. Lactose serves as the major disaccharide source material. On a total weight basis, lactose and fructose constitute the major mono- and disaccharide components of the frozen dessert formula.

A variety of fructose-containing materials may be used as a fructose source. High fructose corn syrups which contain more than 50% by weight fructose are especially adapted for use in this invention with the commercial 55-60% and 90% fructose corn syrups being a particularly suitable fructose source material. These 55-60% and 90% HFCS respectively contain about 40-36% and about 7% dextrose with the balance being comprised of higher saccharides. The fructose content will generally comprise from at least 40% by weight (e.g. 40-90%) and advantageously from about 50% to about 75% (of the total monosaccharide weight) in the frozen dessert.

The lactose may be derived from a variety of dairy sources such as whole and skim milk, evaporated and condensed milk, dry whole milk and dry skim milk. Non-fat dry milk solids (e.g. regular and instant dry skim milk) are a particularly satisfactory source for the milk protein and milk sugar requirements of the dessert compositions. Non-fat milk solids (NFMS) are typically comprised of approximately 3-4% water, 35% protein, 0.7-0.8% fat, 51-53% lactose, with the balance being primarily ash. Although the lactose content of the dessert composition may broadly range from about 10 to about 40 parts by weight lactose for each 30 parts by weight fructose, the fructose content will advantageously exceed the lactose content.

The weight ratio of total monosaccharides to disaccharides in the dessert recipe (e.g. fructose+dextrose to lactose+maltose) may broadly range from 1:1 to 4:1 with significantly improved results being obtained at weight ratio levels ranging from about a 2:1 to about 3:1. In dessert compositions formulated with NFMS used as the milk protein source material, the total maltose content from all sources will advantageously be less than 15% of total corn sweetener dry solids weight and preferably less than 10% by weight.

Although refined milk protein or isolates may be used as a milk protein source material, it is advantageously obtained from the same source as the lactose. The milk protein and maltodextrin concentration affects the melt-down, freezing temperature and textural properties of the dessert compositions.

Maltodextrins are a class of hydrolyzate products obtained by hydrolyzing starch to a D.E. of less than 20. Maltodextrins consist of a mixture of higher polysaccharides with relatively small amounts of mono-to pentasaccharides. A typical maltodextrin saccharide analysis provides a saccharide distribution of 1-3% monosaccharides, 2-5% disaccharides, 5-9% trisaccharides, 4-7% tetrasaccharides, 4-9% pentasaccharides and 65-80% hexa- and higher saccharides. Maltodextrins of a 10 to 19 D.E. are most common with the commercially available 5% D.E. products being used to a lesser extent. On a total maltodextrin and milk protein weight basis (d.s.b.), the maltodextrin content will advantageously constitute at least 40% and preferably from about 50% to about 70% of the total milk protein and maltodextrin dry weight.

Under the present invention, the non-milk sugar additives may be obtained totally from corn syrup sweeteners. In preparing the high fructose dessert compositions with other sweetening additives, the amount of monosaccharide and disaccharide other than the fructose should be carefully controlled.

Advantageously, the dessert compositions will contain in addition to the lactose and fructose sweeteners, from about 12 to about 60 parts by weight of a 20-50 D.E. corn syrup for each 30 parts by weight fructose. The 36 and 42 D.E. corn syrups are particularly satisfactory for this purpose. Although the weight ratio of these low D.E. corn syrups to fructose may broadly range from about 1:5 to about 1:1, the weight ratios will advantageously range from about 1:3 to about 1:4 and most preferably at a level of about 1:2. The higher D.E. corn syrups (e.g. D.E. greater than 50% with high levels of dextrose and/or maltose) are generally unsatisfactory unless used sparingly (e.g. less than 10%).

Conventional protective hydrocolloids and gums for frozen dessert products (e.g. agar, algin, carrageenan, furcellaran, gum arabic, xanthan, tragacanth, locust bean, gums, CMC, methylcellulose, karaya, etc.) in conventional amounts (e.g. usually less than 1.0% total dry solids weight and most typically from 0.2 to 0.5% dry solids weight) may also be included within the dessert product recipe. It is also advantageous to use conventional food grade emulsifiers or surface active agents in amounts sufficient to emulsify and stabilize the fat globules. Illustrative emulsifiers include natural (e.g. phospholipids, inositol phosphate, etc.), synthetic ionics (e.g. dioctyl sodium sulfosuccinate, etc.) and nonionic emulsifiers such as the glycerol monoesters, propylene glycol monoesters, sorbitan esters, sucrose esters, polyglycol esters, polyoxyethylene esters, polyoxyethylene sorbitan esters, complex esters (lactate, tartarate, etc.), mixtures thereof and the like. The emulsifier concentration in such frozen dessert compositions will be typically less than 0.5% of the dry solids weight and will usually range from about 0.05 to about 0.2% by weight. Other conventional frozen dessert additives such as natural and synthetic colors and flavors, and humectants may likewise be added to the recipe as desired.

An important advantage of the present invention arises from the ability to achieve the desired attributes of high quality dessert mixes at high fructose concentration while still fulfilling the product identity standards. To meet such standards, the combined weight total of non-fat milk solids and butterfat must meet minimum standards (e.g. 11% for ice milk, 20% for ice cream, etc.). The invention permits the frozen dessert manufacturer to rely upon sweetener additives which consist essentially of starch hydrolyzate sweeteners such as corn syrup. The dessert products of this invention provide exceptional whipping, foam, stability, emulsifying, freeze-thaw, freezing, melt-down and textural characteristics.

The following examples are illustrative of the invention.

EXAMPLE 1

A soft-serve ice milk was prepared from the following ingredients:

| Ingredient | % (d.s.b.) |
|---|---|
| Butterfat | 5.00 |
| Milk solids - non-fat | 6.00 |
| HFCS (55% fructose)[1] | 9.50 |
| 36 D.E. corn syrup[2] | 7.50 |
| Maltodextrin (10 D.E.) | 3.50 |
| Stabilizer/emulsifier[3] | 0.35 |
| Total solids | 31.85 |

[1]Staley ISOSWEET 5500-77% sweetener solids consisting of 55% fructose, 41% dextrose, 2.5% maltose and 1.5% D.P₃ and higher saccharides.
[2]Staley 300 corn syrup-80% sweetener solids consisting of 14% dextrose, 12% maltose, 14% maltotriose and 60% D.P₃ and higher saccharides
[3]Continental Colloids-CC #514

The aforementioned ingredients were uniformly blended together in a conventional mixing vat heated at 160° F. (71.1° C.) for 30 minutes and homogenized at 2500 p.s.i. in a two-stage, piston homogenizer. The homogenized ingredients were then immediately cooled to 40° F. (4.44° C.) over a surface cooler and aged at 40° F. (4.44° C.) for 24 hours. Sufficient flavoring and coloring additives were then uniformly blended into the aged mix. The mix was then placed into a conventional soft-serve dispenser and frozen at 18° F. ($-7.9°$ C.)

The soft-serve formula contained (on a total dry solids basis) 5.225 pbw fructose, 3.895 pbw dextrose, 3.12 pbw lactose, 2.1 pbw milk protein and 1.138 pbw maltose. On a 30 parts by weight (pbw) fructose basis, it contained approximately 22.4 pbw dextrose, 17.9 pbw lactose, 12 pbw milk protein, 20 pbw maltodextrin and 6.5 maltose. The monosaccharide (dextrose+fructose) to dissachride (lactose+maltose) weight ratio was 2.14:1. The mono- and disacchrides constitute the major non-fat components of the formula with the lactose plus sweetener additives (i.e. total lactose+HFCS and 36 D.E. corn syrup weight) totaling 74.5% by weight of the total non-fat dry solids. The maltodextrin constituted 62.5% of the total maltodextrin and milk protein weight with the total maltose content being less than 7% (6.7%) of the total dry solids weight of the corn sweetener additives. The fructose constitutes about 39% by weight of the total mono- and dissachride content and about 57.3% by weight of the monosaccharide content.

The textural, melt-down, draw-down, freezing point, sweetness, overrun, preceived coldness and mouthfeel characteristics were at least equal in performance to a conventional frozen soft-serve ice milk formulated with (on a dry solids weight basis) 5.00 pbw butterfat, 12.50 pbw non-fat milk solids, 10 pbw sucrose, 4 pbw 36 D.E. corn syrup solids and 0.35 pbw stabilizer/emulsifier.

The performance results were quite unexpected in view of the fact the conventional formulation contains almost two times more non-fat milk solids than the fructose formula. The fructose formula was within the typical 15°–20° F. drawing temperature range for conventional soft-serve formulas. When dispensed into a cone, the fructose formulation maintained its frozen structure for more than six minutes.

EXAMPLE 2

Several soft-serve ice milk formulations were prepared in accordance with the Example 1 methodology. The formulating ingredients are itemized in Table I.

TABLE I

| Ingredient | Formula (parts by weight solids) | | | |
|---|---|---|---|---|
| | A | B | C | D |
| Butterfat[4] | 5.00 | 5.00 | 5.00 | 5.00 |
| NFMS | 6.00 | 6.00 | 6.00 | 6.50 |
| Fructose[5] | 9.00 | 5.00 | 9.50 | 10.00 |
| 36 D.E. corn syrup[6] | 9.00 | 10.00 | 7.50 | 5.00 |
| Maltodextrin (10 D.E.) | 2.00 | 5.00 | 3.50 | 5.00 |
| Stabilizer/emulsifier[7] | 0.75 | 0.35 | 0.35 | 0.35 |
| Total solids | 31.75 | 31.35 | 31.85 | 31.85 |

[4]Whipping cream-36% fat
[5]₁ Supra
[6]₂ Supra
[7]₃ Supra

Each formula was flavored with 2 fluid ounces of vanilla for each 5 gallons of mix. Formulas A–D were then tested for freezing and dispensing performance, the results of which are reported in Table II.

TABLE II

| Draw Time (minutes) | Product Overrun (%) | | | | Product Temperature (°F.) | | | |
|---|---|---|---|---|---|---|---|---|
| | A | B | C | D | A | B | C | D |
| 0 | 40.7 | 43.4 | 45.2 | 43.4 | 17.3 | 21.3 | 16.7 | 17.8 |
| 2 | 42.5 | 35.7 | 40.7 | 43.4 | 17.0 | 19.7 | 17.2 | 17.8 |
| 4 | 44.3 | 34.1 | 40.7 | 40.7 | 17.5 | 19.5 | 16.9 | 17.6 |
| 6 | 42.5 | 36.5 | 44.3 | 43.4 | 17.0 | 19.3 | 17.7 | 18.1 |
| 8 | 44.3 | 39.9 | 42.5 | 35.7 | 17.5 | 19.6 | 16.7 | 17.3 |
| 10 | 40.7 | 38.7 | 40.7 | — | 17.0 | 19.9 | 16.7 | — |
| 12 | 40.7 | 35.9 | 49.0 | — | 17.2 | 19.7 | 19.5 | — |

As illustrated by Table II data, the product overrun and drawing temperatures are compatible with conventional soft-serve freezing and dispensing equipment. Products A–D maintained excellent cone peaks 6 minutes after dispensing which indicates the products have excellent melt-down characteristics at normal serving temperatures. Products A, C and D were superior in dryness, appearance and body. The fresh Zahn (#2 cup) at 50° F. and overnight mix viscosities (#3 cup) at 38° F. were respectively 31.7 and 25.0 seconds for sample C and 35 and 27.5 seconds for sample D. The Brookfield mix viscosities (Type LVT at 5 bar 3 rpm) of 29.2–25.6 cps for formula C and 28.8–37.4 cps for formula D compared favorable to 28.1–33.2 cps viscosity value obtained from the comparative sucrose formulation mentioned in Example 1.

Although the above Examples illustrate the preparation of soft-serve ice milks, the invention may be adapted to the broad range of flavored frozen dessert compositions such as vanilla, coffee, maple, caramel, chocolate, fruit (e.g. strawberry, apricot, pineapple, blackberry, etc.), nuts (e.g. almonds, pistachio, walnuts, etc.), confections (e.g. peppermint stick, buttercrunch, chocolate chip, etc.). The fructose-containing recipes herein are advantageously used to prepare frozen dessert compositions wherein a homogenous mix containing milk protein, triglyceride fat (preferably butterfat) and sweeteners (lactose plus added sweetener) is whipped (e.g. air or inert edible gas) and partially frozen into a product of creamy consistency which has sufficient fluidity to be drawn from the freezing zone and placed into a receptacle (e.g. cone, container, etc.) while still retaining a sufficient partially frozen structure to maintain its creamy, foamed integrity. The partially frozen product may be directly consumed as a soft-serve product or hardened by further freezing. It may be used in batch freezers, continuous freezers, low temperature continuous freezers, soft-serve freezers and counter freezer operations which respectively are generally operated at drawing temperatures of 24° F.–26° F., 21° F.–22° F., 16° F.–18° F., 18° F.–20° F. and 26° F. The soft-serve products (e.g. ice milk, ice cream, frozen custards, milk shakes, malted milk, mellorine, etc.) and hardened soft-serve products are especially adaptable to the embodiments of this invention. Advantageously, the dessert products herein are characterized as having a drawing temperature within the 15° F.–20° F. range and preferably within the 18° F.–20° F. range.

What is claimed is:

1. A frozen dessert composition of a smooth, creamy textural consistency formulated with milk protein, lactose, butterfat, starch-derived sweeteners and maltodextrin wherein at least 70% by weight of the non-fat solids are sweetener solids, said composition comprising 30 parts by weight fructose with fructose comprising at least 25% by weight of the total monosaccharide and disaccharide sweetener weight of the frozen dessert composition, about 10 to about 40 parts by weight lactose and about 10 to about 60 parts by weight milk protein and maltodextrin with the maltodextrin comprising from 20% to 80% of the total milk protein and maltodextrin weight and the weight ratio of fructose to maltodextrin ranges from about 6:1 to about 1:3.

2. The composition according to claim 1 wherein the fructose comprises at least a major weight of the total monosaccharide sweetener weight.

3. The composition according to claim 2 wherein the maltodextrin comprises from about 50 to about 70 weight percent of the total maltodextrin and milk protein dry solids weight.

4. The composition according to claim 3 wherein the frozen dessert composition is characterized as having a drawing temperature within the 15° F. to 20° F. range.

5. The composition according to claim 1 wherein the dessert composition is a soft-serve dessert composition and the non-dairy sweetener portion of the frozen dessert consists essentially of high fructose corn syrup which contains fructose on a total dry solids weight basis as the major dry solid and from about 12 to about 60 parts by weight of 20–50 D.E. corn syrup solids.

6. The composition according to claim 5 wherein the fructose comprises from 50 to 75% by weight of the total monosaccharide content of the composition and the maltodextrin comprises from about 50 to about 70% of the total milk protein and maltodextrin dry solids weight.

7. The composition according to claim 4 wherein the non-fat milk and butterfat dry solids ranges from 11 to 20% by weight of the total dessert dry solids.

8. The composition according to claim 3 wherein the non-fat milk and butterfat dry solids is at least 20% by weight of the dry solids in the dessert composition.

9. In a method for preparing a frozen dessert composition wherein a homogeneous mix containing milk protein, triglyceride fat and sweetening agent is whipped and partially frozen in a freezing zone into a partially frozen dessert composition of a smooth, creamy consistency, the dessert composition is drawn from the freezing zone and placed into a receptacle, the improvement which comprises a homogeneous mix comprised of 30 parts by weight fructose, about 10 to about 40 parts by weight lactose, from about 10 to about 60 parts by weight milk proteins and maltodextrin with the maltodextrin comprising from about 20% to about 80% by weight of the total milk protein and maltodextrin dry solids weight, triglyceride fat and a sufficient amount of sweetener to provide a sweetener concentration of at least 70% by weight of the total non-fat solids weight with fructose comprising at least 25% by weight of the total monosaccharide and disaccharide sweetener weight of the mix.

10. The method according to claim 9 wherein the fructose comprises at least a major weight of the total monosaccharide sweetener weight.

11. The method according to claim 10 wherein the maltodextrin comprises from about 50 to about 70 weight percent of the total maltodextrin and milk protein dry solids weight.

12. The method according to claim 11 wherein the frozen composition is a soft-serve frozen dessert characterized as having a drawing temperature within the 15° F. to 20° F. range.

13. The method according to claim 9 wherein the non-dairy sweetener portion for the frozen dessert consists essentially of high fructose corn syrup which, on a total dry solids weight basis, contains fructose as the major dry solid component and from about 12 to about 60 parts by weight of 20–50 D.E. corn syrup solids.

14. The method according to claim 13 wherein the fructose comprises from 50 to 75% by weight of the total monosaccharide content of the composition and the maltodextrin comprises from about 50 to about 70% of the total milk protein and maltodextrin dry solids weight.

15. The method according to claim 12 wherein the non-fat milk and butterfat dry solids ranges from 11 to 20% by weight of the total dessert dry solids.

16. The method according to claim 15 wherein the frozen dessert product is characterized as having a drawing temperature within the 18° F. to 20° F. range.

17. The method according to claim 12 wherein the non-fat milk and butterfat dry solids of the mix is at least 20% by weight of the dry solids in the dessert composition.

* * * * *